United States Patent

[11] 3,597,689

[72] Inventor Philip J. Ferrell
Seattle, Wash.
[21] Appl. No. 594,244
[22] Filed Nov. 14, 1966
[45] Patented Aug. 3, 1971
[73] Assignee The Boeing Company
Seattle, Wash.

[54] COMMUNICATION SYSTEM
1 Claim, 2 Drawing Figs.

[52] U.S. Cl. .......... 325/51, 325/35
[51] Int. Cl. .......... H04b 1/100
[50] Field of Search .......... 325/49, 51, 55, 64, 33, 35; 340/224, 171; 343/225, 228

[56] References Cited
UNITED STATES PATENTS

| | | | |
|---|---|---|---|
| 2,392,693 | 1/1946 | Purington .......... | 325/35 |
| 3,124,748 | 3/1964 | Webb, Jr. .......... | 325/35 |
| 2,333,992 | 11/1943 | Fox .......... | 325/37 |
| 2,616,031 | 10/1952 | Nosker .......... | 325/37 |
| 3,020,398 | 2/1962 | Hyde .......... | 250/199 V X |
| 3,140,468 | 7/1964 | Blaisdell et al. .......... | 340/171 |
| 3,310,802 | 3/1967 | Coleman et al. .......... | 325/33 |
| 3,372,335 | 3/1968 | Takada .......... | 325/64 |
| 3,441,858 | 4/1969 | Graham .......... | 325/55 |

*Primary Examiner*—Robert J. Griffin
*Assistant Examiner*—Anthony H. Handal
*Attorneys*—Glenn Orlob, Kenneth W. Thomas and Lee R. Murchison

ABSTRACT: This invention relates to communication systems and more particularly to a communication system wherein a plurality of separate information transmitters can simultaneously transmit information through a common, relatively small bandwidth communication channel to a single commonly-and-continuously shared receiver.

PATENTED AUG 3 1971 3,597,689

Figure 1:
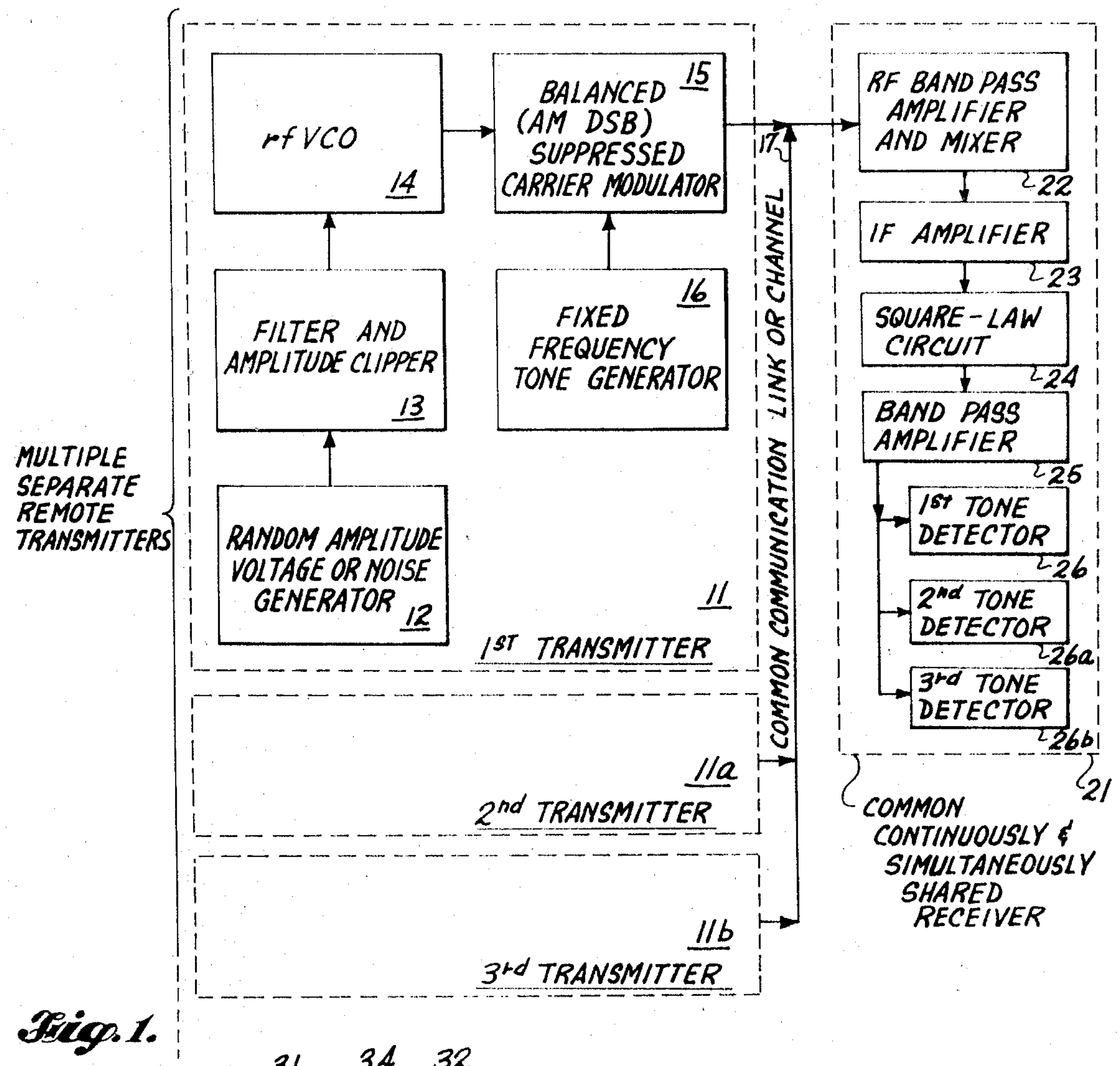

INVENTOR.
PHILIP J. FERRELL
BY
Lee R. Murchison
AGENT

COMMUNICATION SYSTEM

BACKGROUND

Often times in communications systems such as, for example, telemetering systems it is desirable to have many points of information initiation transmit their respective information to a common receiving or monitoring point. In doing this it is more efficient to use a common communication channel with as little demand for breadth in channel bandwidth as possible.

Some past systems have attempted this by using multiple, frequency-spaced carriers. Other systems have used various complex sequential sampling schemes whereby the points from which it is desired to transmit information are interrogated in time sequence.

Thus, the past schemes have in one manner or another required complex equipment and considerable bandwidth in order to insure proper identification of the source point corresponding to the information and also to prevent interference between the informations being transmitted.

OBJECTS

Accordingly, a principal objects of this invention is to provide a communication system wherein many remote transmitters can communicate simultaneously through a relatively small bandwidth channel to a single remote receiver.

A related object is to provide a communication system of improved efficiency of bandwidth utilization.

A further related object is to provide a cochannel communication system wherein multiple information transmissions can spectrally overlap into a common receiver without causing interference even though simultaneously received.

A further object of this invention is to provide a communication system of fewer components and less complex equipment arrangements making it more efficient economically and less complex structurally than has heretofore been recognized for comparable operation.

Another important object is to provide a communication system featuring a novel squaring circuit which greatly enhances the system operation by its superior performance compared with more conventional receiver detection processes.

Another important object is to provide a communication system featuring a novel random-frequency carrier transmitter for information placed thereon in the form of sinusoidal amplitude modulation.

Another object of this invention is to provide an apparatus embodying a method for communicating information from multiple remote points wherein a single continuously-shared relatively small bandwidth channel can be used for simultaneous multiple information transmissions into a single continuously shared receiver.

SUMMARY

In accordance with the teachings of the present invention the above advantages and objects are achieved in the preferred embodiment for a tone-alarm system herein described through the use of a plurality of separate remote fixed-single-frequency tone alarms each of which tone alarms is double sideband suppressed carrier amplitude modulated on to its respective randomly variable carrier. The use of a novel transmitter having random, (suppressed) carrier creates fixed-separation-frequency, randomly varying single-frequency sideband signal pairs and thereby prohibits the simulation of the tone alarms in a commonly, continuously and simultaneously shared receiver by beat-frequency signals generated between intertransmitter combinations of the sideband pairs, their random-frequency carriers having been at or near the same signal frequencies. Novel square-law circuit means is featured in the receiver and means for extending the basic concept of the invention beyond the preferred tone-alarm embodiment are given. The application of the invention is explained to extend to carriers in sound media and also electrical media such as the electromagnetic spectra.

FIGURES

These and other aspects of the present invention will be more clearly understood from the following description when read with reference to the accompanying drawings wherein, FIG. 1 is a block diagram of a preferred, tone-alarm embodiment of the communication system of this invention.

Figure 2:
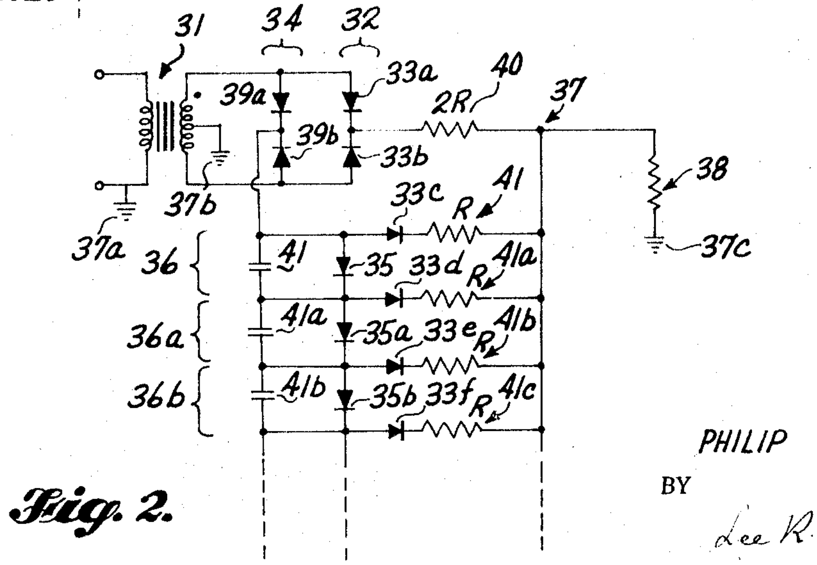

FIG. 2 is a schematic of a novel square-law circuit for use in the receiver of the preferred embodiment of FIG. 1.

CONSTRUCTION

The construction details of the present invention are explained in connection with FIG. 1 as follows:

A required number of random-carrier radiofrequency transmitters is designated by 11, 11*a*, 11*b* etc. Thus, one transmitter 11, 11*a*, 11*b* etc. is provided for each point from which information is to be initiated. Each transmitter 11, 11*a*, 11*b* etc. is essentially structurally identical as follows:

A conventional random amplitude voltage or noise source 12 is connected through a conventional filter and amplitude clipper 13 to a conventional radiofrequency voltage controlled oscillator 14. THe radiofrequency (RF) voltage controlled oscillator (VCO) 14 is connected to a conventional balanced (amplitude-modulated, double-sideband, suppressed carrier) modulator 15 which balanced modulator 15 is also connected to a conventional fixed-single-frequency sine-wave tone generator 16.

The balanced modulator 15 is connected to a common communication link or channel 17 shared with all of the other transmitters 11, 11*a*, 11*b* etc. which communication link 17 in the preferred embodiment is a common small band of radiofrequency signals compatible with the selected frequency ranges for the voltage-controlled oscillators 14, 14*a*, etc.

For a communication channel linking, all of the transmitters and the receiver, the radiofrequency signals may be placed in a common channel in the electromagnetic spectra by the use of suitable antennas or transmitted over an appropriate line channel such as provided for example by a suitable wire line or coaxial cable.

A common continuosly-and-simultaneously shared receiver 21 has a conventional radiofrequency band-pass amplifier and mixer 22 connected to the common communication link or channel 17 which amplifier and mixer 22 is also connected to a conventional intermediate frequency amplifier 23. A square-law circuit 24 (See FIG. 2) is connected to the intermediate frequency amplifier 23 which square-law circuit 24 is also connected through a conventional band-pass amplifier 25 to a set of conventional paralleled tone detectors 26, 26*a*, 26*b* etc. corresponding respectively to the transmitters 11, 11*a*, 11*b* etc.

Referring to FIG. 2, the construction of a novel square-law circuit, which is particularly suitable for incorporation in the receiver of FIG. 1, is now described.

A transformer 31 is electrically connected across a conventional first full-wave rectifier 32 comprised of first and second diodes 33*a* and 33*b*. The transformer is also connected across a conventional second gating-and-bias full-wave rectifier 34 in parallel with the first full-wave rectifier 32. The second, gating-and-bias full-wave rectifier 34 is comprised of first and second gating-and-bias diodes 39*a*, 39*b*. THe first full-wave rectifier 32 is connected through a series resistor (2R) 40 across a squared-output resistor 38.

A paralleled, iterative set of circuit sections 36, 36*a*, 36*b*, etc. are connected to the second, gating-and-bias full-wave rectifier 34. Each iterative circuit section 36, 36*a*, 36*b*, etc. is connected to the summing junction 37.

The circuit section designated by "36" is now taken for descriptive purposes as representative of the construction of the iterative circuit sections. It is comprised of a third bias diode 35 connected across a third gating diode 33c-and-resistor (R) 41 combination connected to the summing junction 37.

Circuit grounds are as designated by 37a, 37b, 37c.

OPERATION

Now an explanation of the operation of the square-law circuit 24 is given followed by an explanation of the operation of the preferred system embodiment of a fixed-tone alarm system.

In operation, the square-law circuit 24 is explained as follows: in brief, the square-law detector (FIG. 2) is so designed that for its design range (e.g. 6 volts) an input voltage causes a current proportional to the square of the input voltage to flow through an output resistor 38 thereby providing an instantaneous squaring operation.

More particularly, the iterative sections 36, 36a, 36b, etc. are so selected that they successively cut "on" and add their respective currents to the total rectified current at the summing junction 37 thereby creating a successive straight-line-segments approximation± of the squared output voltage across the squared-voltage output resistor 38.

In still greater particularity of explanation of the square-law circuit 24 operation it will be noted that first and second diodes 33a and 33b of the first full-wave rectifier 32 feed current through a series resistor (2R) 40 into the current summing junction 37.

A second, gating-and-bias full-wave rectifier 34 in parallel with the first full-wave rectifier 32 also rectifies the input voltage 31 cutting "on" as soon as the forward breakdown characteristic of the appropriate first or second gating-and-bias diode 39a or 39b is exceeded and conducting through a third diode 33c to add this current to the total current flowing through the summing junction 37. When the voltage at the junction of gating-and-bias diodes 39a and 39b exceeds the forward breakdown characteristic of a third bias diode 35 then a fourth gating diode 33d turns "on" and conducts through the second parallel resistor 41a adding this additional current to the summing junction 37 and so forth for the successive identical i.e. iterative sections 36, 36a, 36b, 36c etc.

FOr the above operation to have good squaring accuracy the squared-output resistor 38 must have as small a resistance as possible. In practice, a value of resistance in the order of 1 percent of the value of a parallel resistance R is found desirable for the squared-output resistor 38. Then when the value of the first series resistance 40 (e.g. 2R=20KΩ) is selected to be twice that of one of the equal-valued parallel resistances 41 (e.g. R=10KΩ) etc., the squared-voltage output across the squared-output resistor 38 has been found to have less than 1 percent to A convenient manner of getting the low resistance desired for the squared-output resistor 38 while simultaneously getting amplification is to use the base-emitter junction of a transistor.

Thus, for example, by using the forward breakdown characteristic of a silicon PN junction (35 series diodes) very accurate successive voltage increments in the 0.6-volt range are obtained. Alternatively, the use of Zener reverse PN junctions would yield equally spaced voltage increments of 4 volts or more, but with present diodes the breakdown characteristic loses accuracy around 5 volts and ceases to exist with virtually any suitable accuracy at 3 volts. THe capacitors are not essential for the circuit operation although it is thought they enhance its performance by producing a smoothing action across the respective forward breakdown voltages held across the bias (silicon) diodes 35, 35a, 35b, etc.

Although other conventional instantaneous squaring apparatus with limited dynamic range such as a field-effect transistor operated in the "pinch-off" region could be used in the signal detection process afforded by the present square-law circuit, the novel square-law circuit herein described affords and finds its particular utility in the present communication system invention because of its wide, in fact, virtually unlimited dynamic range capability not found in conventional instantaneous squaring apparatus. Moreover, the instantaneous squaring capability extends to very high frequencies making it peculiarly adapted to the high frequency squaring capability preferred when the present invention is practiced in the electromagnetic spectra as will be understood from the following operational description of a fixed tone alarm system incorporating such a squaring circuit.

A plurality of randomly variable carriers (VCO's 14, 14a, etc.) are used in conjunction with double sideband suppressed (randomly variable) carrier tone amplitude modulation 15. The occurrence of an event such as a fire or a blown circuit breaker causes (e.g. by a thrown relay) a tone 16 of frequency indicative of the source point of information to be modulated on the randomly variable carrier at the remote point or source of information 11, 11a, 11b, etc. experiencing the event. The associated carrier is suppressed in the balanced modulator 15 leaving only the respective frequency-separated single-frequency sideband pairs to be transmitted. All of the various respective sideband pairs which may be occurring at any given time are fed simultaneously into a common narrow-band communication channel 17 connected with a single continuously-and-simultaneously shared receiver 21.

The nature of the present invention allows the plurality of such tone-alarm carriers to be simultaneously present and at or near the same frequency, even experiencing spectral overlapping of the single-frequency sideband pairs, thereby giving very narrow band operation into a single simultaneously used receiver 21.

The receiver 21 band-pass receives and amplifies all of the transmitted sideband pairs equally. Since only sideband pairs have fixed frequency differences as determined by their respective source-indicative tone origins 16 it remains only to detect the presence or absence of such a sideband pair in order to detect the presence or absence of the particular amplitude modulation of the respective tone sources 16. Such detection is accomplished by a square-law circuit 24 used to provide electrical signals of fixed frequency double the frequency of each of the respective fixed tone modulations represented by the sideband pairs present which double-frequency signals are used with suitable band-pass filtering 25 to cause the response of an appropriate double-frequency tone detector 26, 26a, 26b, etc. such as a resonant ringer in order to provide an alarm at the receiver upon the presence of the corresponding tone modulation alarm signal.

Note that the mixing 22 and intermediate frequency amplification 23 was omitted from the above discussion although shown on the drawing of FIG. 1. This conventional superheterdyne operation although preferable for high VCO 14 frequencies, giving high sideband signal frequencies, can often be omitted as above for lower VCO 14 frequencies.

THEORY

The theoretical mathematical operational analysis of the above-described fixed tone-alarm (FIG. 1) and square-law circuit 24 (FIG. 2) is now outlined.

The above-described fixed-tone alarm embodiment with double sideband suppressed (randomly variable) carrier gives an output from each transmitter of two amplitude-modulation originated single-frequency sideband signals and for this mathematical explanation take a representative two-transmitter system.

Then for the first transmitter let, $A=\text{Cos}2\pi(f_{c1}+F_1)t$ upper sideband signal $B=\text{Cos}2\pi(f_{c1}-F_1)t$ lower sideband signal Where $F_1$ = frequency of fixed-tone amplitude modulation and $f_{c1}$ =carrier frequency of first transmitter and $t$ =time Then correspondingly for the second transmitter, $C$, $D$, $f_{c2}$ and $F_2$ Such a combined signal, A+B+C+D being summed into a single-valued voltage function upon being received is operated on by the square-law circuit 24, as above explained in connection with the operation of FIG. 2, i.e. squared or multiplied times itself: $(A+B+C+D)^2=A^2+B^2+C^2+D^2+\underline{2AB}+2AC+2AD+2BC+2BD+\underline{2CD}$ By trigonometric identity, $$2AB = \text{Cos } 2\pi\{[(f_{c1}-F_1) \quad (f_{c1}-F_1)]t\}$$

$$- \text{Cos } 2\pi\{[(f_{c1}-F_1)+(f_{c1}-F_1)]t\}$$

$$- \underbrace{\text{Cos } 2\pi\{[2F_1]t\}}_{\text{desired double-frequency tone}} - \underbrace{\text{Cos } 2\pi\{[2f_{c1}]t\}}_{\text{eliminated by filter}}$$

$$2CD = \text{Cos } 2\pi\{[(f_{c2}-F_2) \quad (f_{c2}-F_2)]t\}$$

$$+ \text{Cos } 2\pi\{[(f_{c2}+F_2)+(f_{c2}-F_2)]t\}$$

$$= \underbrace{\text{Cos } 2\pi\{[2F_2]t\}}_{\text{desired double-frequency tone}} + \underbrace{\text{Cos } 2\pi\{[2f_{c2}]\}}_{\text{eliminated by filter}}$$

Since the carrier frequencies ($f_{c1}$ and $f_{c2}$) vary randomly relative to each other, and since only the above underlined "2AB" term and the "2CD" term have the same carrier frequencies cancelling in their differences cosine factors, only those two terms produce a signal of fixed double the tone amplitude modulation frequency, ($2F_1$ or $2F_2$ respectively) when a fixed-tone modulation, as represented by a sideband pair is present and the fixed double frequency is band passed 25 to appropriate detectors 26.

Accordingly, all of the other products will produce only signals of randomly varying frequency in the output of the square-law circuit 24 and hence appear as noise, whereas the fixed double-frequency signals (2F) corresponding to the difference frequencies respective fixed-tone-produced sideband pairs are recognized by tone detectors 26 as described above in connection with the operation of the preferred embodiment of FIG. 1.

Note that in simplifying the above trigonometry for outline like explanatory purposes, only the information portion namely the amplitude-modulation double-sideband signals of the transmitted signals is emphasized in order accurately, yet without complexity, to illustrate the end theoretical result upon which the system operation is based.

SUITABLE COMPONENTS

Having explained the construction, mode of operation, and theory of operation of one preferred embodiment, now a specific set of components and signal frequencies which have been found experimentally to work well in the above described embodiment are given:

In a four transmitter **11, 11*a*, 11*b*, 11*c*** embodiment of the tone-alarm communication system:

1. A conventional 50 kc. wide channel 17 (100 kc. to 150 kc.) such as provided by a two-wire line or a coaxial cable.

2. A conventional voltage controlled oscillator (VCO) 14 such as a standard telemetry VCO known as "IRIG Band 15."

3. A conventional transistor noise generator 12 such as a conventional three-stage transistor amplifier with a transistor noise source, i.e. a transistor with no input except its PN junction noise and suitable amplification therefor.

4. A conventional amplitude clipper 13 such as 6-volt zener diodes to limit the amplitude excursions of the transistor noise generator 12 voltage so that only a ±25 kc. VCO 14 maximum frequency excursion is produced. Preferably in combination with the amplitude clipper 13 is a conventional low-pass filter to limit the frequency components of the random voltage-amplitude waveform to less than 7 or 8 kc.

5. A conventional tone generator 16 (tuning fork controlled) such as a Motorola TU217 series "Vibra-Sender" having fixed tone generations for the four transmitters respectively of 118.8 c.p.s. 173.8 c.p.s. 473.2 c.p.s. and 645.7 c.p.s.

6. A conventional balanced modulator 15 such as Hewlett-Packard (H-P) model 10514–14 Double Balanced Mixer.

7. A conventional (100 kc. to 150 kc.) band-pass amplifier 22 such as H-P model 450-A tuned radiofrequency receiver.

8. A conventional intermediate frequency amplifier 23 is not required where the radio frequencies (100 kc. to 150 kc.) are sufficiently low not to require the superheterodyne principle.

9. A square-law detector 24 such as described in connection with FIG. 2, using silicon diodes (such as the 1 N645 with a 0.6-volt forward breakdown characteristic) for the bias diodes **39*a*, 39*b* and 35, 35*a*, 35*b*, etc. and germanium diodes (such as the 1 N34A with, for practical purposes, no forward conduction voltage drop as compared with the silicon diodes) for the third et. seg. gating diodes 33*c*, 33*d*, 33*e***, etc.

10. COnventional tone detectors **26, 26*a*, 26*b*** etc. such as the Motorola TU333 series "Vibra Sponder" or tuning fork filter or resonant reed relays wherein momentary touching of the reed relay contacts triggers a silicon-controlled rectifier lighting a pilot lamp for indicating the reception of a tone signal.

ADDITIONAL EMBODIMENTS

With the preceding description of the construction, mode of operation, and theory of a preferred embodiment and from the following a person skilled in this art will realize that the teaching of this invention extends by various combinations of conventional components beyond the preferred, illustrative embodiment such as, for example, to small variations in the fixed-tone amplitude modulation used with a suitable conventional small bandwidth filter in combination with suitable conventional amplitude demodulation apparatus to follow such variations when such combination is substituted for the respective tone detectors **26, 26*a*, 26*b***, etc., of the above-described preferred embodiment.

Moreover a slight shifting of the fixed-tone frequency discretely back-and-forth can be used to produce frequency-shift keying in the output of a conventional filter and discrete tone recognition apparatus substituted for the respective tone detectors **26, 26*a*, 26*b***, etc. For this operation, it often would be convenient to alternate between upper and lower sidebands with a partially suppressed carrier. The simultaneous presence of both sidebands versus one sideband (and carrier) could also be used or for that matter a number of such tone permutations could be used.

Also, the fixed-tone can be turned "on" and "off" for serial binary bit transmission selectively identified in passing through the tone detectors **26, 26*a*, 26*b***, etc.

Also, instead of the two "frequency-separted," "single-frequency" sideband signals of the described and preferred fixed-tone embodiment, either sideband signal plus preferably a partially suppressed carrier can be transmitted. By "frequency-separated" it is meant that neither of the sideband signals has the same frequency at the same instant in time. By "single-frequency" it is meant that each sideband signal at any instant in time is not comprised of multiple sinewave components but instead has a single fundamental frequency. Thus, the above embodiments result in the transmission of randomly varying signal pairs having a constant or slowly varying difference frequency.

Also, the voltage-controlled oscillator can be conventionally designed to produce oscillations in the sound range and the invention practiced in a sound media such as used for sonar.

Further, the variable-carrier-frequency effect obtained by the described voltage controlled oscillator is also obtainable by an equivalent to various conventional means for imposing phase angle variations on a fixed carrier which is in effect varying the carrier frequency.

There has thus been disclosed a preferred fixed-frequency tone-alarm system embodiment along with various alternative embodiments. While the invention has been specifically disclosed by reference to specific embodiments, it is of course to be understood that the same is done for purpose of illustration only and that modifications and changes can be made by a person skilled in this art as a result of the teachings hereof as encompassed by the following claims.

What I claim is:

1. A communications system comprising, 1. a plurality of transmitter means operative to produce a plurality of signal pairs experiencing spectral overlapping, each of said transmitter means comprising a random signal generator, filter and amplitude limiting means responsive to said random signal generator, voltage controlled oscillator means responsive to the output of said filter and amplitude limiting means, balanced modulator means responsive to the output of said voltage-controlled oscillator means and also responsive to fixed frequency tone generation means;

2. a communication channel means responsive to said plurality of transmitter means for providing a communication link that is continuously-and-simultaneously shared by all of said plurality of transmitter means, and 3. a receiver means comprising band-pass means responsive to said plurality of signal pairs, square-law circuit means responsive to said band-pass means for producing received tones corresponding to transmitted fixed frequency tones, a plurality of tone detector means and means coupling said square-law circuit to said plurality of tone detector means.